(12) United States Patent
Lovasz et al.

(10) Patent No.: US 10,815,709 B2
(45) Date of Patent: Oct. 27, 2020

(54) APPARATUS AND REMOVABLE ROOF ASSEMBLY FOR A MOTOR VEHICLE

(71) Applicant: FORD GLOBAL TECHNOLOGIES, LLC, Dearborn, MI (US)

(72) Inventors: Ronald M. Lovasz, Allen Park, MI (US); David Brian Glickman, Southfield, MI (US); Harry Lobo, Canton, MI (US); Paul Kenneth Dellock, Northville, MI (US); Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 15/910,443

(22) Filed: Mar. 2, 2018

(65) Prior Publication Data

US 2019/0271182 A1    Sep. 5, 2019

(51) Int. Cl.
| | | |
|---|---|---|
| *B60J 1/08* | (2006.01) | |
| *E05C 19/00* | (2006.01) | |
| *B60J 7/11* | (2006.01) | |
| *E05B 83/00* | (2014.01) | |
| *B60J 7/19* | (2006.01) | |
| *B60J 7/10* | (2006.01) | |

(52) U.S. Cl.
CPC ............ *E05C 19/009* (2013.01); *B60J 1/085* (2013.01); *B60J 7/106* (2013.01); *B60J 7/11* (2013.01); *B60J 7/194* (2013.01); *E05B 83/00* (2013.01)

(58) Field of Classification Search
CPC ........ E05C 19/009; B60J 1/085; B60J 7/106; B60J 7/11; B60J 7/194

USPC .................. 296/146.15, 146.16, 218
See application file for complete search history.

(56) References Cited

U.S. PATENT DOCUMENTS

| | | | |
|---|---|---|---|
| 4,067,605 A | 1/1978 | Green et al. | |
| 4,127,302 A | 11/1978 | Green | |
| 4,290,640 A | 9/1981 | Dalton | |
| 4,468,064 A | 8/1984 | McAdams, Sr. | |
| 4,792,166 A * | 12/1988 | Shiraishi ................. | B60J 7/194 292/36 |
| 5,738,405 A * | 4/1998 | Richters ................. | B60J 1/085 296/146.15 |
| 8,960,734 B2 | 2/2015 | Camp | |

(Continued)

OTHER PUBLICATIONS

"Open-Top Goodness: 2015 Jeep Renegade "My Sky" Removable Roof Panels"; The Fast Lane Car; https://www.tflcar.com/2015/01/open-top-goodness-2015-jeep-renegade-two-my-sky-removable-roof-panels/; pp. 1-2.

*Primary Examiner* — Joseph D. Pape
(74) *Attorney, Agent, or Firm* — David Coppiellie; King & Schickli, PLLC

(57) ABSTRACT

An apparatus includes a panel, a removable window and a latch assembly for securing the removable window to the panel. In one embodiment, a removable roof assembly for a motor vehicle includes a removable roof panel, a releasable locking feature that secures the removable roof panel to the motor vehicle, a removable window and a latch assembly. The latch assembly secures the removable window to the removable roof panel. The latch assembly includes a push button actuator to release the latch assembly and remove the removable window from the removable roof panel.

18 Claims, 4 Drawing Sheets

(56) References Cited

U.S. PATENT DOCUMENTS

| | | |
|---|---|---|
| 9,539,938 B1 | 1/2017 | Bosco et al. |
| 2015/0152665 A1 | 6/2015 | Camp |

* cited by examiner

APPARATUS AND REMOVABLE ROOF ASSEMBLY FOR A MOTOR VEHICLE

TECHNICAL FIELD

This document relates generally to the motor vehicle equipment field and, more particularly, to an apparatus in the form of a panel and a cooperating removable window as well as to a removable roof assembly for a motor vehicle.

BACKGROUND

Many motor vehicle owners desire an open air driving experience. In order to meet this demand, motor vehicle manufacturers offer motor vehicles with removable panels such as removable roof panels and removable rear cap systems. Currently, those removable panels and rear cap systems incorporate permanently bonded windows such as rear quarter windows that are not meant to be removed by motor vehicle owners.

This document relates to a new and improved apparatus as well as to a new and improved removable roof assembly for a motor vehicle that allows a motor vehicle owner to easily remove the panel/rear cap windows quickly and safely in order to achieve an open air experience. Window removal also substantially reduces the weight of the panel or the rear cap thereby allowing it to be more easily handled and removed from the motor vehicle as desired by the motor vehicle owner. Significantly, both the removable windows and the removable panels/rear cap may be removed in an efficient manner in a relatively short period of time without struggling.

SUMMARY

In accordance with the purposes and benefits described herein, a new and improved apparatus is provided. That apparatus comprises a panel, a removable window and a latch assembly that secures the removable window to the panel. The latch assembly includes a push button actuator to quickly and easily release the latch assembly and allow one to remove the removable window from the panel. A latch assembly may be provided at each corner of the removable window.

The panel may be a roof cap. The roof cap may include an upper section, a first rear quarter section and a second rear quarter section. The removable window may be received in a recessed margin surrounding a first window opening in the upper section.

The apparatus may further include a first removable quarter window covering a second window opening in the first rear quarter section and a second removable quarter window covering a third window opening in the second rear quarter section.

A latch assembly may be provided at each corner of the removable window, the first removable quarter window and the second removable quarter window. At least one latch assembly at at least one corner of each window may include a locking feature to deter theft. That locking feature may include a key receiver and a cooperating key configured for receipt in the key receiver.

The latch assembly may include a latch mechanism that is carried on the removable window and a locking pin that is carried on the panel. In addition, the latch mechanism may include an outer housing, receiving the push button actuator, and an inner housing received in the push button actuator.

A plurality of apertures may be provided in the inner housing and a plurality of retaining balls may be received in the plurality of apertures. Further, the apparatus may include a locking plunger that may be received in the inner housing as well as a locking plunger spring that biases the locking plunger toward an entry opening of a locking pin receiver in the inner housing.

In addition, the apparatus may include a return spring. That return spring may extend between the push button actuator and the inner housing. The return spring may bias the push button actuator toward a home position.

In accordance with an additional aspect, a removable roof assembly is provided for a motor vehicle. That removable roof assembly comprises a removable roof panel, a releasable locking feature securing the removable roof panel to the motor vehicle, a removable window and a latch assembly. The latch assembly secures the removable window to the removable roof panel. Further, the latch assembly includes a push button actuator to release the latch assembly and remove the removable window from the removable roof panel. A latch assembly may be provided at each corner of the removable window.

The panel may be a roof cap. The roof cap may include an upper section, a first rear quarter section and a second rear quarter section. The removable window may be received in a recessed margin surrounding a first window opening in the upper section.

The apparatus may further include a first removable quarter window covering a second window opening in the first rear quarter section and a second removable quarter window covering a third window opening in the second rear quarter section.

A latch assembly may be provided at each corner of the removable window, the first removable quarter window and the second removable quarter window. At least one latch assembly at at least one corner of each window may include a locking feature to deter theft. That locking feature may include a key receiver and a cooperating key configured for receipt in the key receiver.

The latch assembly may include a latch mechanism that is carried on the removable window and a locking pin that is carried on the removable roof panel. That latch mechanism may include an outer housing that receives the push button actuator and an inner housing received in the push button actuator.

The removable roof assembly may further include a plurality of apertures in the inner housing and a plurality of retaining balls freely received in the plurality of apertures. In addition, the removable roof assembly may include a locking plunger that is received in the inner housing and a locking plunger spring that biases the locking plunger toward an entry opening of a locking pin receiver formed in the inner housing.

In addition, the removable roof assembly may include a return spring. That return spring may extend between the push actuator and the inner housing. The return spring biases the push button actuator toward a home position.

In accordance with yet another aspect, a motor vehicle is provided that incorporates the removable roof assembly described herein.

In the following description, there are shown and described several preferred embodiments of the apparatus, the removable roof assembly and the motor vehicle incorporating the removable roof assembly. As it should be realized, the apparatus, the removable roof assembly and the motor vehicle are capable of other, different embodiments and their several details are capable of modification in various, obvious aspects all without departing from the apparatus, the removable roof assembly and the vehicle as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus, the removable roof assembly and the motor vehicle and together with the description serve to explain certain principles thereof. In the drawing figures.

Reference will now be made in detail to the present preferred embodiments of the apparatus, the removable roof assembly and the motor vehicle, examples of which are illustrated in the accompanying drawing figures.

DETAILED DESCRIPTION

Figure 1:
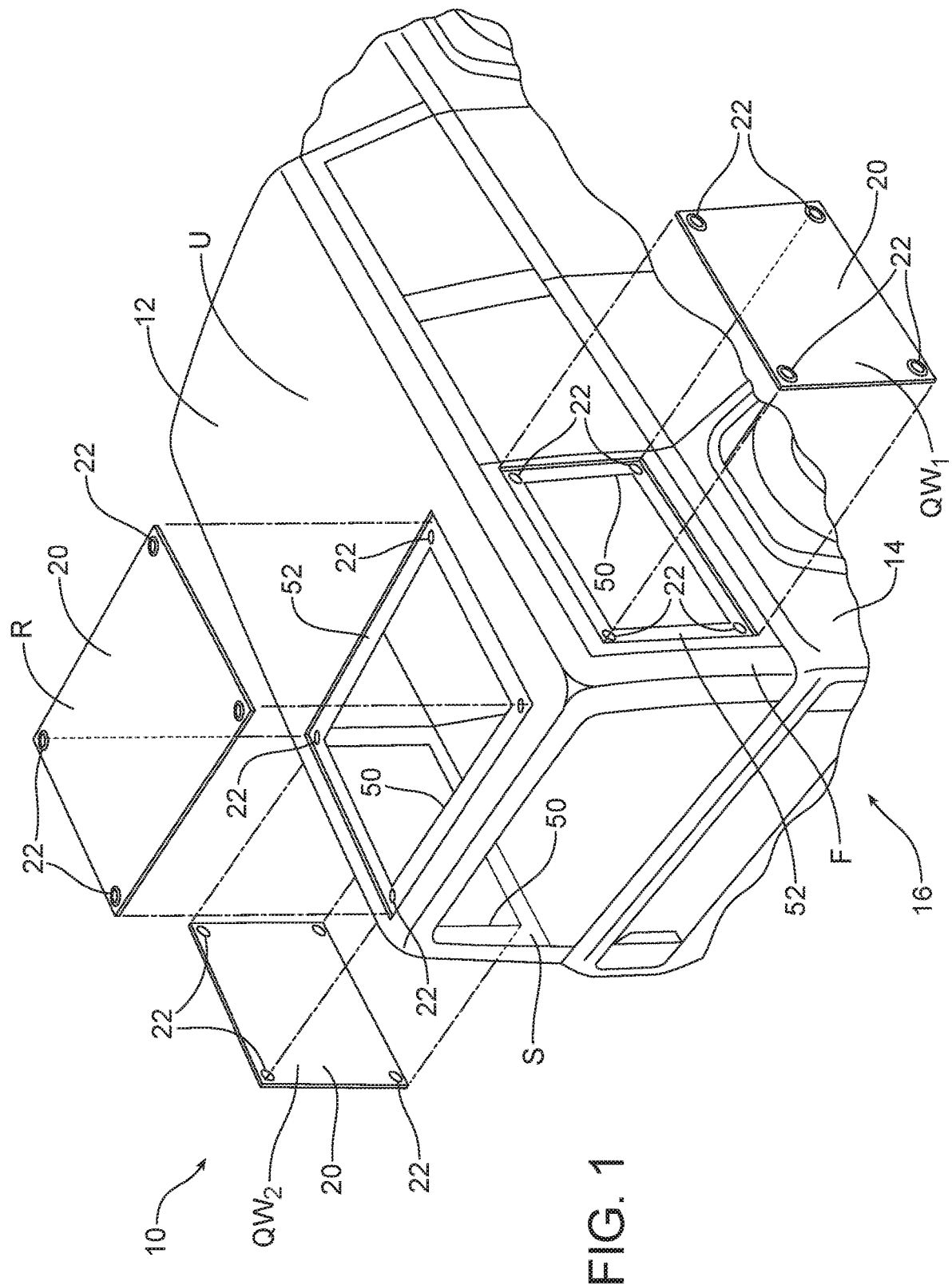
FIG. 1 is a partially exploded perspective view of a motor vehicle incorporating the removable roof assembly.

Reference is now made to FIG. 1 illustrating the apparatus 10. In the illustrated embodiment, the apparatus 10 comprises a removable roof assembly incorporating a removable roof cap or roof panel 12 which may be secured to and released from the body 14 of the motor vehicle 16 by means of a releasable locking feature (not shown) of a type known in the art to be useful for this purpose. In the illustrated embodiment, the removable roof cap or roof panel 12 includes an upper section U, a first rear quarter section F and a second rear quarter section S. A removable roof window R is carried over a roof window opening 50 while a first removable quarter window $QW_1$ is carried over a first rear quarter window opening 50 in the first rear quarter section F and a second removable quarter window $QW_2$ is carried over a second rear quarter window opening 50 in the second rear quarter section S. In the following description, the removable roof window R, the first removable quarter window F and the second removable quarter window S are all referred to as removable windows 20.

Figure 2:
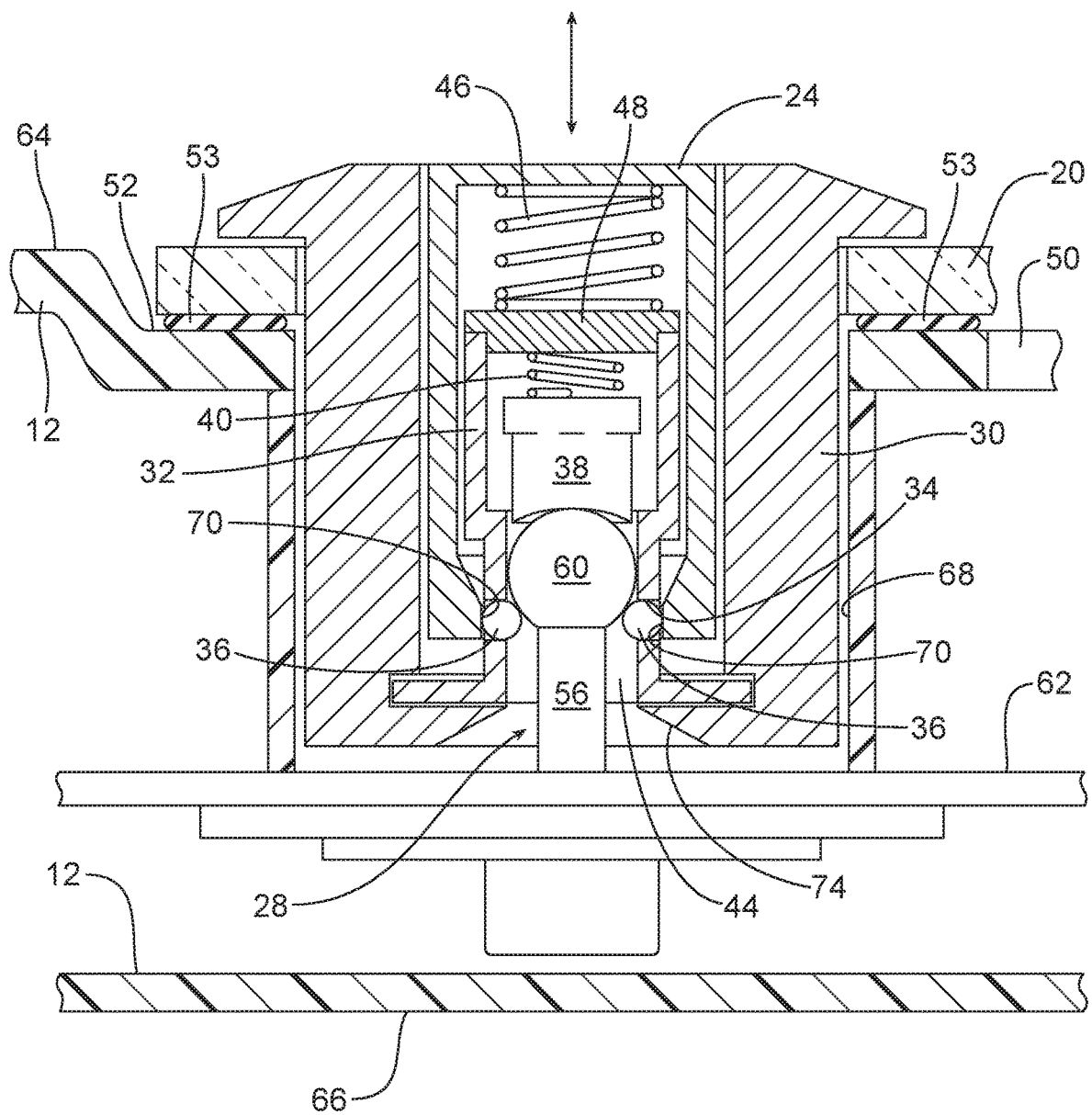
FIG. 2 is a detailed cross-sectional view illustrating the latch assembly of the apparatus and removable roof assembly in a latched condition.
Figure 3:
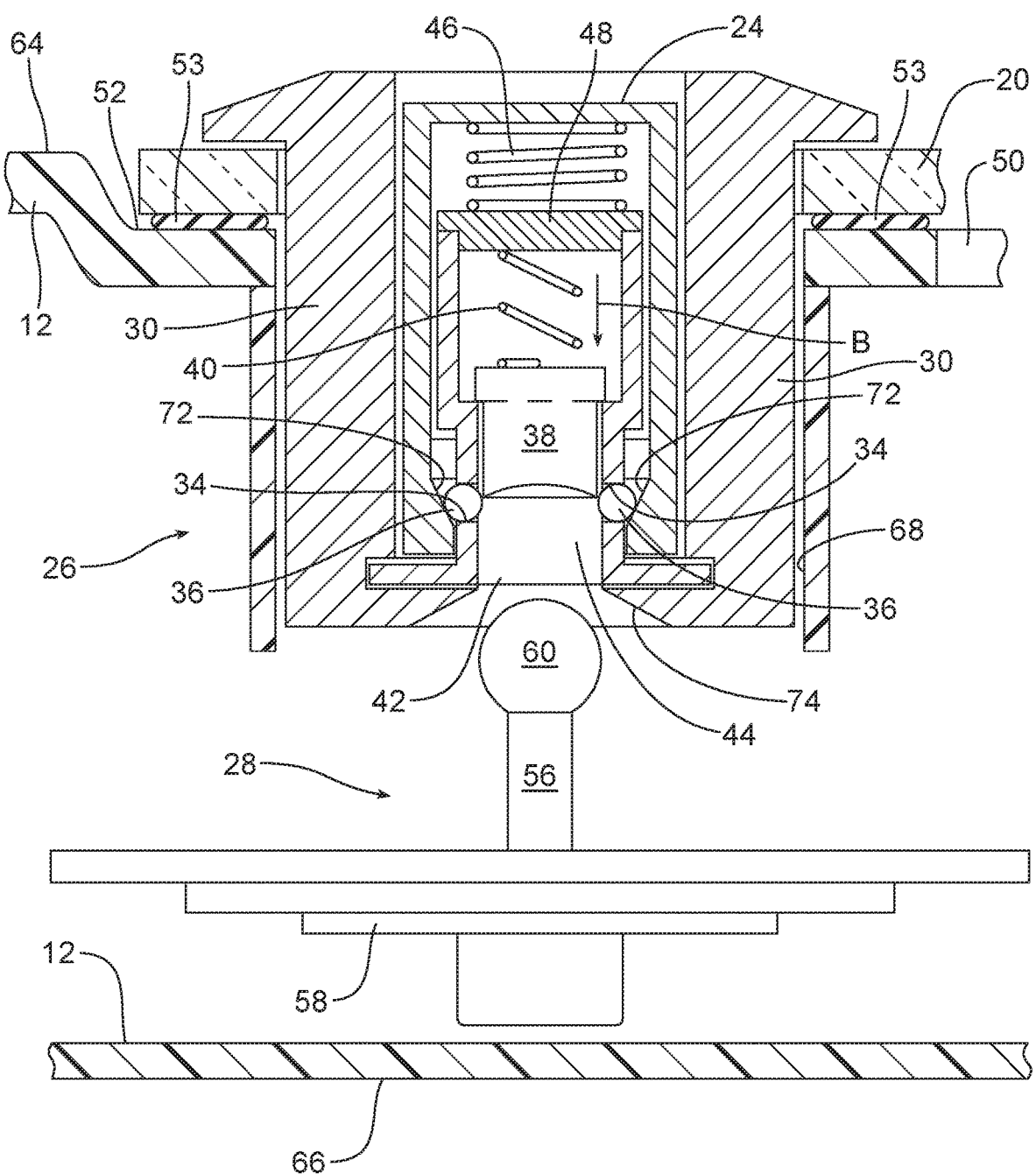
FIG. 3 is a view similar to FIG. 2 but illustrating the latch assembly in an unlatched condition.

A plurality of latch assemblies 22 are adapted for securing the removable windows to the removable roof panel 12. As illustrated in FIGS. 2 and 3, each latch assembly 22 includes a push button actuator 24 to release the latch assembly and remove the removable window 20 from the removable roof panel 12. More specifically, as illustrated in FIGS. 2 and 3, each latch assembly 22 includes a latch mechanism 26, carried on the removable window 20 and a locking pin 28 carried on the removable roof panel 12.

As illustrated, the latch mechanism 26 includes an outer housing 30 that receives the push button actuator 24 and an inner housing 32 received within the push button actuator 24. A plurality of apertures 34 are aligned and radially arrayed around the inner housing 32. A plurality of retaining balls 36 are freely received in the plurality of apertures 34.

A locking plunger 38 is received in the inner housing 32. A locking plunger spring 40 biases the locking plunger 38 toward the entry opening 42 of a locking pin receiver 44 in the inner housing 32. A return spring 46 extends between the push button actuator and the cap 48 of the inner housing 32. As will be appreciated from the following description, the return spring 46 functions to bias the push button actuator 24 toward a home position that is illustrated in drawing FIG. 2.

As illustrated in FIG. 1, four separate latch assemblies 22 are provided to secure each of the removable windows 20 in the window openings 50 provided in the removable roof cap or panel 12. As should be appreciated, each of the window openings 50 may be surrounded by a recessed margin 52 into which the associated removable window 20 nests when secured to the removable roof cap or panel 12 so that the window is essentially flush with the roof cap to thereby minimize any wind noise. A weather strip or seal 53 may be provided along the recessed margin 52 in order to seal out wind and moisture when the removable window is properly seated and fixed to the removable roof cap or panel 12 by the latch assemblies 22. See FIG. 2.

Reference is now made to FIGS. 2 and 3 which illustrate the operation of each latch assembly 22. As illustrated, each locking pin 28 includes a shank 56 having a base and mounting flange 58 at a proximal end and an enlarged head 60 at a distal end. The mounting flange 58 is fixed to the removable roof cap or panel 12 by any appropriate means. In the illustrated embodiment, the locking pin 28 is mounted on the substrate or bracket 62 held between the outer wall 64 and inner wall 66 of the roof panel 12. A well 68 is provided in the roof panel 12. The locking pin 28 is provided within the well 68 which is sized and shaped to receive the outer housing 30 of the latch mechanism 26. The windows 20 are fixed in position nested in the recessed margins 52 surrounding the window openings 50 by engaging the locking pins 28 in each of the cooperative latch mechanism 26 at the corners of the windows as illustrated in FIG. 2. More specifically, the projecting and enlarged head 60 of each locking pin 28 is received in the locking pin receiver 44 of each latch mechanism 26. The enlarged head 60 is engaged against the locking plunger 38 and captured in the locking pin receiver 44 between the locking plunger 38 and the retaining balls 36 which are held in a position projecting inward against the enlarged head 60 by the bearing surface 70 of the push button actuator 24.

When one wishes to release the removable windows 20 and detach the removable windows from the removable roof cap or panel 12, one must press the push button actuator 24 of each latch mechanism 26. FIG. 3 illustrates the push button actuator 24 in the depressed position. In this position, the sloped cam surface 72 along the inner wall of the push button actuator 24 is aligned with the retaining balls 36 and the apertures 34. This creates clearance for the outward movement of the retaining balls 36 into the apertures 34 as the locking plunger spring 40 biases the locking plunger 38 in the direction of action arrow B. As the locking pin is withdrawn from the latching mechanism 26 in the direction of action arrow B, the retaining balls 36 are pushed radially outward providing clearance for the enlarged head 60 of the locking pin 28 to pass out of the locking pin receiver 44 thereby freeing the removable window 20 from the removable roof cap or panel 12. Upon release, the push button actuator 24 is returned to the home position illustrated in FIG. 2 by operation of the return spring 46.

When one wishes to again fix the removable window 20 to the removable roof cap or panel 12, one aligns the removable window so that the locking pin receiver 44 of the latch mechanism 26 at each corner of the window is aligned with the cooperating locking pins 28 fixed to the removable roof cap or panel 12 at each corner of the recessed margin 52. The tapered entry 74 provided in the outer housing 30 that converges toward the locking pin receiver 44 aids in the proper aligning of the removable window with the removable roof cap or panel 12. Once aligned, one pushes the removable window toward the removable roof cap or panel 12 to gently force the enlarged head 60 of each locking pin against the force of the locking plunger spring 40 until the enlarged head 60 snap past the retaining balls 36 and are again locked in position.

Figure 4:
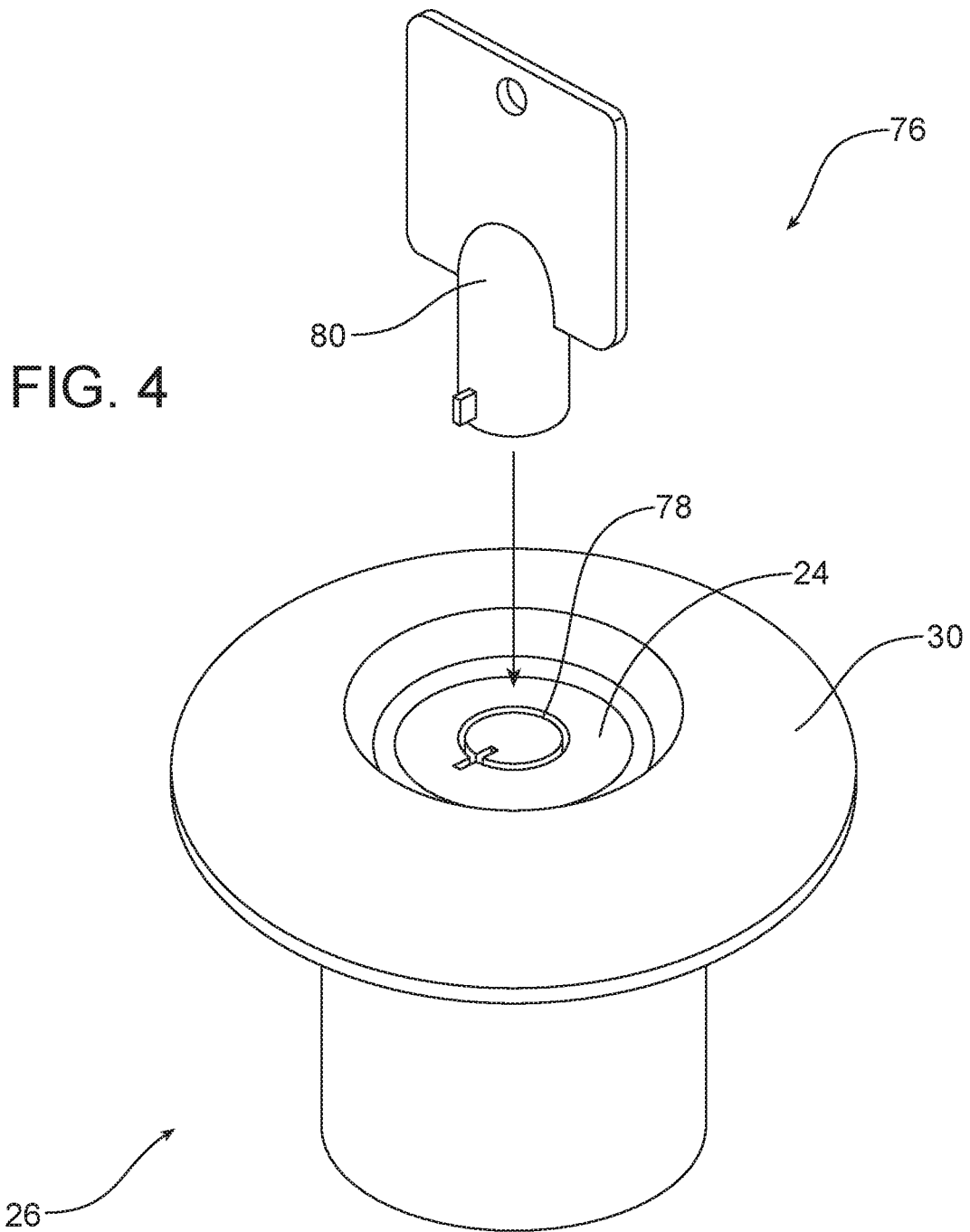
FIG. 4 is a perspective view illustrating an alternative embodiment of the apparatus incorporating a locking feature including a key receiver and a key configured for receipt in the key receiver.

As illustrated in FIG. 4, one or more of the latch mechanisms 26 that secure each removable window 20 in position may include a locking feature 76 to prevent theft. As illustrated in FIG. 4, that locking feature 76 may comprise a key receiver 78 integrated into the push button actuator 24 and a cooperating key 80 configured for receiving and unlocking of the key receiver. When the locking feature 76 is locked, the push button actuator 24 is secured in the home position with the retaining balls 36 biased radially inward to securely hold the enlarged head 60 of the locking pin 28 in the locking pin receiver 44 of the latch mechanism 26 thereby preventing theft of the removable window. Such a push button locking feature 76 is known in the art.

The foregoing has been presented for purposes of illustration and description. It is not intended to be exhaustive or to limit the embodiments to the precise form disclosed. Obvious modifications and variations are possible in light of the above teachings. For example, the releasable locking feature that secures the removable roof cap or panel 12 to the body 14 of the motor vehicle 16 may incorporate a latch assembly 22 as described above. It should also be appreciated that the latch assembly 22 may be reversed from that illustrated in the drawing figures with the latch mechanisms 26 secured to the removable roof cap or panel and the locking pins 28 secured to the removable windows 20. All such modifications and variations are within the scope of the appended claims when interpreted in accordance with the breadth to which they are fairly, legally and equitably entitled.

What is claimed:

1. An apparatus, comprising:
    a panel;
    a removable window; and
    a latch assembly securing said removable window to said panel, said latch assembly including a push button actuator to release said latch assembly and remove said removable window from said panel wherein one said latch assembly is provided at each corner of said removable window.

2. The apparatus of claim 1, wherein said latch assembly includes a latch mechanism, held in said removable window, and a locking pin carried on said panel.

3. The apparatus of claim 2, wherein said panel is a roof cap.

4. The apparatus of claim 3, wherein said roof cap includes an upper section, a first rear quarter section and a second rear quarter section.

5. The apparatus of claim 4, wherein said removable window is received in a recessed margin surrounding a first window opening in said upper section.

6. The apparatus of claim 5, further including a first removable quarter window covering a second window opening in said first rear quarter section and a second removable quarter window covering a third window opening in said second rear quarter section.

7. The apparatus of claim 6, wherein one said latch assembly is provided at each corner of said first removable quarter window and said second removable quarter window.

8. The apparatus of claim 6, wherein said at least one latch assembly at at least one corner of each of said removable window, said first removable quarter window and said second removable quarter window includes a locking feature to deter theft.

9. The apparatus of claim 8, wherein said locking feature includes a key receiver and a key configured for receipt in said key receiver.

10. A removable roof assembly for a motor vehicle, comprising:
    a removable roof panel;
    a releasable locking feature securing said removable roof panel to said motor vehicle;
    a removable window; and
    a latch assembly securing said removable window to said removable roof panel, said latch assembly including a push button actuator to release said latch assembly and remove said removable window from said removable roof panel wherein said latch assembly includes a latch mechanism, held in said removable window, and a locking pin carried on said removable roof panel.

11. The removable roof assembly of claim 10, wherein one said latch assembly is provided at each corner of said removable window.

12. The removable roof assembly of claim 10, wherein said panel is a roof cap.

13. The removable roof assembly of claim 12, wherein said roof cap includes an upper section, a first rear quarter section and a second rear quarter section.

14. The removable roof assembly of claim 13, wherein said removable window is received in a recessed margin surrounding a first window opening in said upper section.

15. The removable roof assembly of claim 14, further including a first removable quarter window covering a second window opening in said first rear quarter panel and a second removable quarter window covering a third window opening in said second rear quarter panel.

16. The removable roof assembly of claim 15, wherein a latch assembly is provided at each corner of said removable window, said first removable quarter window and said second removable quarter window.

17. The removable roof assembly of claim 15, wherein at least one latch assembly at at least one corner of each of said removable window, said first removable quarter window and said second removable quarter window includes a locking feature to deter theft.

18. A motor vehicle incorporating the removable roof assembly of claim 10.

* * * * *